(12) United States Patent
Baranowski et al.

(10) Patent No.: US 11,034,333 B2
(45) Date of Patent: Jun. 15, 2021

(54) WIPER UNIT FOR A WINDSHIELD WIPER SYSTEM AND METHOD FOR PRODUCING A WIPER UNIT

(71) Applicant: FORD GLOBAL TECHNOLOGIES, LLC, Dearborn, MI (US)

(72) Inventors: Thomas Baranowski, Würselen (DE); Markus Franzen, Stolberg (DE); Maik Broda, Würselen (DE); Pascal Rebmann, Weilerswist (DE)

(73) Assignee: Ford Global Technologies, LLC, Dearborn, MI (US)

( * ) Notice: Subject to any disclaimer, the term of this patent is extended or adjusted under 35 U.S.C. 154(b) by 243 days.

(21) Appl. No.: 16/277,357

(22) Filed: Feb. 15, 2019

(65) Prior Publication Data
US 2019/0256052 A1    Aug. 22, 2019

(30) Foreign Application Priority Data

Feb. 16, 2018  (DE) .................... 102018202425.1

(51) Int. Cl.
*B60S 1/32* (2006.01)
*B29C 45/14* (2006.01)
(Continued)

(52) U.S. Cl.
CPC .......... *B60S 1/32* (2013.01); *B29C 45/14631* (2013.01); *B60S 1/0408* (2013.01); *B60S 1/3415* (2013.01);
(Continued)

(58) Field of Classification Search
CPC ........ B60S 1/522; B60S 1/0455; B60S 1/524; B60S 1/32; B60S 1/0408; B60S 1/3415;
(Continued)

(56) References Cited

U.S. PATENT DOCUMENTS 6,129,093 A * 10/2000 Kelly .................... B60S 1/0477
134/6
6,253,411 B1 * 7/2001 Aichele ................. B60S 1/3874
15/250.43
(Continued)

FOREIGN PATENT DOCUMENTS

DE    19813230 A1    9/1999
DE    19835065 A1    2/2000
(Continued)

OTHER PUBLICATIONS

EP3162644B1 (machine translation) (Year: 2017).*

(Continued)

*Primary Examiner* — Andrew A Horton
(74) *Attorney, Agent, or Firm* — David Coppiellie; King & Schickli, PLLC

(57) ABSTRACT

A wiper unit for an automobile windshield wiper system has at least one wiper arm connectable to a wiper drive of the windshield wiper system and at least one wiper blade supported by the wiper arm. In order to provide a lightweight wiper unit that can be produced cost-effectively and offers greater design freedom, at least one fiber-reinforced nonmetallic strip is arranged on the outside of the wiper arm and/or the wiper blade. That nonmetallic strip extends over at least half the length of the wiper arm or wiper blade, is connected to the wiper arm or the wiper blade in a substance-bonded manner, and is arranged at least in part on a side of the wiper arm or wiper blade which is arranged facing or facing away from an automobile windshield which is to be wiped.

13 Claims, 5 Drawing Sheets

Figure 1:
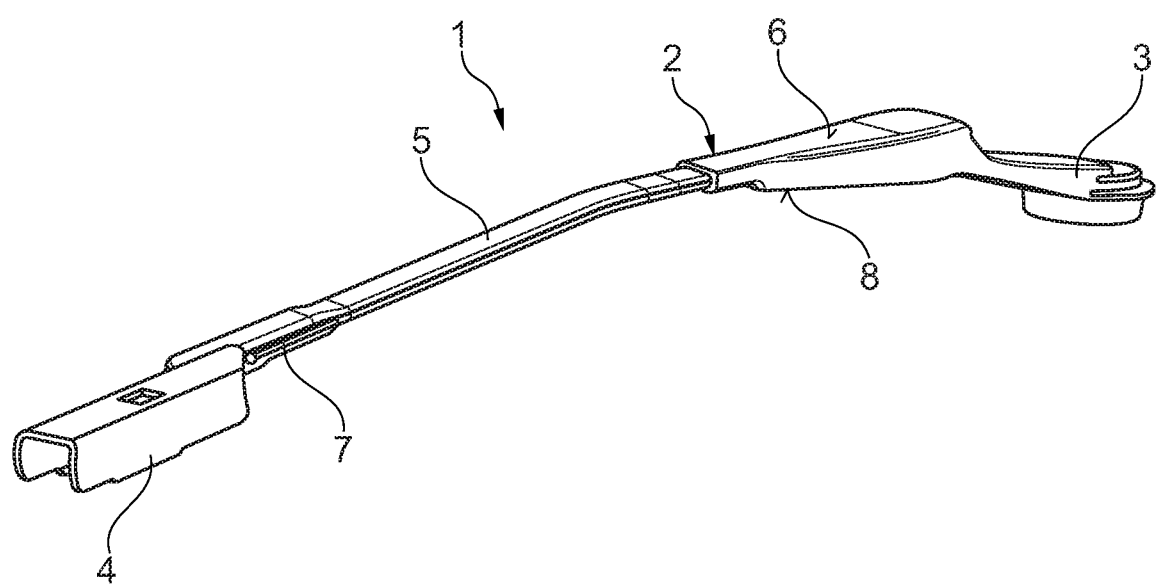

(51) Int. Cl.
  *B60S 1/34* (2006.01)
  *B60S 1/38* (2006.01)
  *B60S 1/52* (2006.01)
  *B60S 1/04* (2006.01)
  *B29L 31/30* (2006.01)
(52) U.S. Cl.
  CPC ............ *B60S 1/3425* (2013.01); *B60S 1/3429* (2013.01); *B60S 1/38* (2013.01); *B60S 1/3806* (2013.01); *B60S 1/3848* (2013.01); *B60S 1/3872* (2013.01); *B60S 1/3874* (2013.01); *B60S 1/522* (2013.01); *B60S 1/524* (2013.01); *B29L 2031/305* (2013.01); *B60S 1/3808* (2013.01); *B60S 2001/3898* (2013.01)
(58) Field of Classification Search
  CPC ........ B60S 1/3425; B60S 1/3429; B60S 1/38; B60S 1/3806; B60S 1/3848; B60S 1/3872; B60S 1/3874; B60S 1/3808; B60S 2001/3898; B29C 45/14631; B29L 2031/305
  See application file for complete search history.

(56) References Cited

U.S. PATENT DOCUMENTS

| | | | |
|---|---|---|---|
| 6,266,843 B1 | 7/2001 | Doman et al. | |
| 6,305,066 B1 | 10/2001 | De Paoli et al. | |
| 2003/0121119 A1 | 7/2003 | Benoit et al. | |
| 2008/0289137 A1 | 11/2008 | Ciaccio et al. | |
| 2013/0247325 A1* | 9/2013 | Boland | B60S 1/3877 15/250.201 |
| 2015/0258966 A1* | 9/2015 | Thebault | B60S 1/3862 15/250.04 |
| 2017/0136994 A1 | 5/2017 | Chen | |
| 2017/0232935 A1* | 8/2017 | Hauser | B60S 1/345 15/250.34 |

FOREIGN PATENT DOCUMENTS

| | | | | |
|---|---|---|---|---|
| DE | 102010043301 A1 | | 5/2012 | |
| EP | 2460700 A1 | | 6/2012 | |
| EP | 2660111 A1 | | 11/2013 | |
| EP | 3053791 A2 | | 8/2016 | |
| EP | 3162644 B1 | * | 10/2019 | ............ B60S 1/3427 |
| FR | 2482540 A1 | | 11/1981 | |
| FR | 2566726 A1 | | 1/1986 | |
| FR | 2755926 B1 | | 1/1999 | |

OTHER PUBLICATIONS

English Machine Translation of DE102010043301A1 dated May 3, 2012.
English Machine Translation of DE19813230A1 dated Sep. 30, 1999.
English Machine Translation of DE19835065A1 dated Feb. 10, 2000.
English Machine Translation of FR2482540A1 dated Nov. 20, 1981.
English Machine Translation of FR2566726A1 dated Jan. 3, 1986.
English Machine Translation of FR2755926B1 dated Jan. 8, 1999.
Ed Grabianowski and Rik Paul; The Best Windshield Wipers for Your Car; The Wirecutter.com, Aug. 10, 2017; pp. 1-17; http://thewirecutter.com/best-windshield-wipers-for-your-car.
K. Balajiu Thattaiparthasarthy, U.K. Vaidya and Selvum Brian Pillay: Damage Tolerance Enhancement Using Continuous Fiber Reinforcements Co-Molded with Long Fiber Reinforced Thermoplastics: pp. 1-9: https://www.researchgate.net/publication/237462504_Damage_Tolerance_Enhancement_Using_Continuous_Fiber_Reinforcements_Co-Molded_With_Long_Fiber_Reinforced_Thermoplastics.

* cited by examiner

WIPER UNIT FOR A WINDSHIELD WIPER SYSTEM AND METHOD FOR PRODUCING A WIPER UNIT

TECHNICAL FIELD

This document relates to a wiper unit, for a windshield wiper system of an automobile, having at least one wiper arm connectable to a wiper drive of a windshield wiper system and at least one wiper blade supported by the wiper arm. This document further relates to a method for producing a wiper unit for a windshield wiper system of an automobile, wherein the wiper unit has at least one wiper arm connectable to a wiper drive of the windshield wiper system and at least one wiper blade supported by the wiper arm.

BACKGROUND

A traditional wiper unit for an automobile windshield wiper system is usually a complex assembly made up of different parts such as, for example, a wiper blade, a wiper arm supporting the wiper blade, a connection unit connecting the wiper blade to the wiper arm, an articulated joint for pivoting the wiper arm perpendicularly to a wiper plane for maintenance purposes, a spring element and the like. In addition, the components of a traditional wiper unit are usually made from different materials, such as steel, for instance, from which sheet steel or the spring element can be produced, aluminum from which a component can be cast, plastic from which a component can be injection-molded, rubber and the like. The different components or materials are connected to one another using different joining methods, in order to achieve a required mechanical stiffness and functionality for the wiper unit.

A wiper unit must ensure a constant pretensioning of the wiper blade with the wiper blade lip arranged thereon against the windshield of the automobile to be wiped and guarantee that the wiper blade can be maintained. The complex design is associated with high costs, including material costs, production costs, development costs, and other types of costs.

US 2003/0121119 A1 discloses an arm/wiper blade combination of an automobile windshield wiper of the kind that comprises a rigid body made of a block of molded plastic generally in elongate form, one end of which is driven during alternating wiping and the other end of which supports a windshield wiper arm or a wiper blade, wherein the body made of a block is at least partly covered by a layer. The layer is a layer to protect the body from harmful external influences such as ultraviolet rays, for example, wherein the protective layer is a polymer. The surfaces of the body and the protective layer which are in contact with one another have means for the mechanical fastening of the protective layer to the body.

US 2008/0289137 A1 discloses an aerodynamic windshield wiper arm which has an integrated aerodynamic element that causes a downward force to be exerted on the wiper arm if the air speed over the wiper arm increases, as is the case in strong winds and/or at high speeds. The aerodynamic element is integrally configured with the wiper arm which means that it is not easy to remove compared with aerodynamic attachments. The wiper arm is formed using an injection-molding method and a plastics material. The aerodynamic element may take the shape of a wing or a lip or any other form that is capable of producing a downwards force when strong winds flow over the wiper arm.

FR 2 755 926 B1 discloses a wiper that is mounted on a drive shaft and supports a wiper blade that has a flexible wiper lip which is fastened in anchoring points at its ends. The wiper blade has a reinforcing brace which extends over the length of the wiper lip. The wiper lip anchored to the wiper blade engages with the brace and the wiper blade is held between its anchoring ends in the longitudinal direction. The reinforcing brace has a tongue, one end of which extends in the longitudinal direction beyond the corresponding end of the wiper lip.

FR 2 482 540 A1 discloses a windshield wiper which has a flexible bow that is tensioned by a clamp connecting the bow ends and to which the wiper blade is fastened. The components are brought into engagement by tooth and fork or tooth and slot engagement, so that the wiper blade itself is not subject to stress in the longitudinal direction. The bow is preferably made of Lexan® polycarbonate; the belt is made of Rilsan® polyamide (e.g. polyamide 11) and is optionally reinforced internally with a (metal) wire or strip, wherein the wiper lip is made of silicon rubber. The arm on which the wiper bow is supported by a pivot is preferably produced from a transparent synthetic material such as Lexan® polycarbonate. The design reduces the weight, assembly costs and impairment of the driver's view.

U.S. Pat. No. 6,305,066 B1 discloses a carrier element for a wiper strip belonging to a wiper blade for automobile windshields, wherein the carrier element connectable to the free end of a driven wiper arm has an elongate, strip-like design, is produced from a flexible plastics material, and the flexible rubber, elongate strip-like wiper strip can be fastened to the carrier element parallel to the longitudinal axis. The carrier element is produced form a fiber-reinforced thermoplastic material, wherein the fibers are blended with the plastics material.

EP 3 053 791 A2 discloses a method for producing windshield wiper bows. The method involves an arrangement of fiber glass layers pre-impregnated with epoxy resin in the lower form of an autoclave, wherein the form exhibits a curved surface in a first horizontal direction which has a constant cross section viewed from another horizontal direction perpendicular to the first direction. Furthermore, the method involves performing a thermo-compression process in the autoclave, in order to obtain a semi-finished product made of composite material which is arranged in layers. In addition, the method involves removing the semi-finished product from the autoclave and cutting said semi-finished product in directions parallel to the first direction, in order to obtain a plurality of flexors.

U.S. Pat. No. 6,266,843 B1 discloses a wiper design for an automobile window, comprising a one-piece carrier that has a central portion with a substantially smooth central upper surface, a substantially smooth central lower surface, wherein the central portion has a first flexibility and a first radius of curvature when it is in an unloaded state. Furthermore, the wiper design has a pair of tips extending from opposite ends of the central portion, wherein each of these pairs of tips has a smooth upper tip surface that is substantially a continuation of the central upper surface and a lower tip surface which has a plurality of laterally extending notches that delimit a pair of toothed opposite side walls. In addition, the wiper design has a longitudinally oriented leaf channel which extends through the carrier between two opposite ends thereof, wherein the leaf channel has a leaf opening in the central, lower surface and the lower tip surface connected thereto. The wiper design furthermore has a wiper blade that can be mounted within the leaf channel and a fastening device on the central portion which is suitable for fastening the carrier to a wiper arm. The tips have a second flexibility which is greater than the first flexibility and a second radius of curvature which is smaller than the first radius of curvature when the system is in an unloaded state, which consequently provides a continuous flexibility transition between the central portion and the tips.

DE 10 2010 043 301 A1 discloses a wiper arm for a wiper arm device having a fastening part for fastening to a drive device and having a wiper rod for receiving a wiper blade. The fastening part and the wiper rod are configured as a one-piece sprung component.

The publication available at https://www.researchgate.net/publication/237462504_DAMAGE_TOLERANCE_ENHANCEMENT_USING_CONTINUOUS_FIBER_REINFORCEMENT S_CO-MOLDED_WITH_LONG_FIBER_REINFORCED_THERMOPLASTICSER discloses an improvement in damage tolerance using continuous fiber reinforcements which are co-molded along with long-fiber-reinforced thermoplastics.

EP 2 660 111 A1 discloses a windshield wiper blade with a wiper element which is in contact with the windshield in its working position and a leaf spring that presses the wiper element against the windshield with the corresponding pressure. The leaf spring is produced from a composite material which has a thermally stable resin matrix, reinforcing fibers distributed over the length of the leaf spring, and inorganic additives. In this way, a leaf spring is obtained which offers adequate stiffness and flexibility for adapting the leaf to the windshield with lengths of over 750 mm and guarantees correct wiping of the windshield without producing noises or other anomalies.

DE 198 35 065 A1 discloses a wiper blade for automobile windshields having an elongate flexible rubber wiper blade that can be applied to the windshield to be wiped which is held substantially parallel to the longitudinal axis on a strip-like, spring-biased carrier element, and having an attachment device for counter-attachment means of a wiper arm that is movable between reverse layers, said counter-attachment means being loadable in relation to the windshield, which attachment device is arranged in the central portion of the carrier element on the upper strip surface thereof facing away from the windshield, connected to the carrier element by means of clamping means, wherein surfaces of the attachment device lie opposite the strip surfaces of the carrier element.

Various embodiments of wiper units for windshield wiper assemblies are disclosed at http://thewirecutter.com/reviews/best-windshield-wipers-for-your-car/.

SUMMARY

The problem addressed by this document is that of providing a lightweight wiper unit that can be produced cost-effectively and offers greater design freedom.

The problem is solved by a wiper unit having the features of the following claims, in which at least one fiber-reinforced nonmetallic strip is arranged on the outside of the wiper arm and/or the wiper blade. That nonmetallic strip extends over at least half the length of the wiper arm or wiper blade, is connected to the wiper arm or the wiper blade in a substance-bonded manner, and is arranged at least in part on a side of the wiper arm or wiper blade which is arranged facing or facing away from an automobile windshield which is to be wiped.

It should be pointed out that the features and measures individually listed in the following description can be combined with one another in any technically feasible manner and disclose further embodiments of the wiper unit. The description characterizes and specifies the wiper unit, in particular in connection with the figures.

Either the wiper arm or the wiper blade or both the wiper arm and the wiper blade are reinforced by means of the at least one fiber-reinforced nonmetallic strip. In the latter case, the wiper arm and the wiper blade can each be provided with at least one suitable fiber-reinforced nonmetallic strip. Alternatively, the wiper arm and the wiper blade can be provided with at least one joint fiber-reinforced nonmetallic strip.

The reinforcement of the wiper arm means that the wiper arm, which is otherwise created from a flexible material or a flexible composite material, in particular as an injection-molded component, provides the wiper unit with adequate stiffness in order for it to function correctly. No other additional components are therefore required in order to reinforce a wiper arm of this kind, which means that the wiper unit can be more lightweight in design. In addition, production steps for producing components of this kind and corresponding assembly steps can be omitted, which reduces material and production costs. These embodiments of the reinforced wiper arm apply accordingly to a wiper blade that is reinforced or provided with the fiber-reinforced nonmetallic strip.

The at least one fiber-reinforced nonmetallic strip is arranged on the outside of the wiper arm and/or the wiper blade. The fiber-reinforced nonmetallic strip is not therefore embedded in the wiper arm or the wiper blade. In this way, a simple attachment of the fiber-reinforced nonmetallic strip to the wiper arm or the wiper blade is possible, including subsequently, once the wiper arm or the other wiper blade has been produced. For example, the fiber-reinforced nonmetallic strip can be inserted into a casting mold beforehand, into which an injection-molding material is injected subsequently which is connected to the fiber-reinforced plastics strip during the hardening of the injection-molding material. Alternatively, the fiber-reinforced nonmetallic strip can be attached following production of the wiper arm or the wiper blade to the injection-molded body thereby created using an injection-molding method.

The fiber-reinforced nonmetallic strip may, for example, extend over at least half to the full length of the wiper arm or the wiper blade, depending on the design of the wiper arm or wiper blade. The fiber-reinforced nonmetallic strip may be connected in a substance-bonded manner to the wiper arm or the wiper blade by means of a bonding or adhesive agent or by heat treatment of at least one contact surface between the fiber-reinforced nonmetallic strip and the wiper arm or the wiper blade.

Since the fiber-reinforced nonmetallic strip is partially or preferably completely arranged on the side of the wiper arm or wiper blade which is arranged facing or facing away from the automobile windshield to be wiped, the fiber-reinforced nonmetallic strip runs accordingly either partially or completely parallel to the automobile windshield. In this way, the wiper arm or the wiper blade can be reinforced with the fiber-reinforced nonmetallic strip in such a manner that the wiper arm or the wiper blade exhibits greater stiffness in respect of the transverse forces acting on the wiper arm or the wiper blade during a wiping action carried out with the windshield wiper system than in the event that the fiber-reinforced nonmetallic strip is not arranged accordingly on the wiper arm or the wiper blade.

This arrangement of the fiber-reinforced nonmetallic strip on the wiper arm and/or the wiper blade means that the wiper arm or the wiper blade can be given a high degree of flexibility of elastic deformability about a bending axis running parallel to the fiber-reinforced nonmetallic strip and perpendicular to the wiper unit. In this way, the carrying-out of maintenance work on the wiper unit is made possible and simplified. In addition, it is possible to ensure that the wiper blade is applied to the windshield over its entire length in each relative position to the automobile windshield, in order to ensure an optimal wiping result.

The fiber-reinforced nonmetallic strip may be configured as a flat strip with reinforcing fibers oriented unidirectionally, bidirectionally or multidirectionally in the longitudinal strip direction. The fiber-reinforced nonmetallic strip may be made from at least one, preferably two or multiple layers with different fiber orientations. The nonmetallic strip may comprise a polymer material in which the reinforcing fibers are at least partially embedded. The polymer material may, in particular with regard to its melting temperature, be similar or identical to a plastics component of the wiper arm or the wiper blade, so that the polymer material, for example during injection-molding of the wiper arm or of the wiper blade, can be connected in a substance-bonded manner to the plastics component of the respective injection-molded material. In this way, a separation of the fiber-reinforced nonmetallic strip from the wiper arm or the wiper blade is reliably prevented. The reinforcing fibers of the plastics strip may, for example, be glass fibers, carbon fibers, aramid fibers, or other artificial or natural fibers.

On account of the arrangement of the fiber-reinforced nonmetallic strip on the wiper arm or wiper blade, a material strength of the wiper arm or the wiper blade can, in addition, be reduced locally or overall. A portion of the wiper arm with a locally reduced material thickness and fiber-reinforced nonmetallic strip arranged thereon may, for example, assume the function of a traditionally present articulated joint via which part of the wiper arm can be pivoted away from the automobile windshield along with the wiper blade for maintenance purposes, for example. In addition, during its elastic deformation this wiper arm portion can produce a resetting force in the direction of the automobile windshield which means that a spring element which is traditionally required for this purpose can be dispensed with.

The wiper arm connects the wiper blade to the wiper drive of the windshield wiper system. The wiper drive may have at least one electric drive, the wiper arm being connectable in a non-rotational manner to the output shaft thereof. Alternatively, the wiper drive may have an electric drive that is connected to the wiper arm via at least one wiper gear.

The wiper blade has at least one wiper lip arranged thereon or monolithically formed therewith which is in contact with the automobile's windshield during a wiping action. In order to ensure that there is sufficient pressing force along the entire length of the wiper blade or the wiper lip by means of which the wiper lip is pressed against the automobile's windshield, in order to allow an optimal wiping operation, the wiper blade or the wiper lip may have a curved shape in their unloaded state.

According to an advantageous embodiment, the wiper arm and the wiper blade are monolithically connected to one another. This means that a traditional connection of different wiper components made of different materials is superfluous, which simplifies the wiper unit production and makes it more cost-effective.

A further advantageous embodiment envisages that the wiper arm and the wiper blade are formed by a single injection-molded component that is formed at least in part from an elastomer. According to this, the wiper unit as a whole may be produced by means of an injection-molding process or an injection-overmolding process. The injection-molding process may, in addition, be used to integrate functional elements in the wiper unit such as, for example, a fixing means for fixing the wiper arm to the wiper gear, fixing means for fixing a wiper lip to the wiper blade, and the like. The injection-molded component may be produced entirely from the elastomer or an elastic body partially or completely encased in the elastomer, wherein the elastomer may be a thermoplastic elastomer.

A material with or without reinforcing fibers contained therein or with or without a filling agent otherwise contained therein such as talcum, for example, may be used as the injection-molding material for producing the wiper arm and the wiper blade in the form of a thermoplastic injection-molded component. Propylene, a polyamide, polyoxymethylene, a polycarbonate or an acrylonitrile-butadiene-styrene copolymer, for example, may be used as the material. Short or long fibers can be used for the fiber reinforcement of the material. For example, glass fibers, carbon fibers, aramid fibers, other artificial or natural fibers can be used for fiber reinforcement. The injection-molding material may, in addition, be foamed by a physical or chemical foaming process, in order to reduce the weight of the injection-molded component. The wiper blade may, for example, be produced using a thermoplastic polymer by means of a multi-component injection-molding process.

Due to the greater design freedom that results from the injection-molding method, the design of the wiper unit can, in particular, be adapted to aerodynamic requirements or optimal mechanical performance by (bionic) ribs and the like. This allows a great variety of different customized designs which are adapted to the automobile's individual needs and requirements.

According to a further advantageous embodiment, the wiper blade has at least one elastic element which is provided at least partially with a casing made of the elastomer. The elastic element may exhibit greater rigidity than the elastomer casing. The elastic element may be elongate in design and produced from a thermoplastic.

According to a further advantageous embodiment, at least one spoiler is formed on the wiper arm and/or the wiper blade. By means of the spoiler, the pressing force with which the wiper blade is pressed against the automobile windshield, particularly when the automobile is travelling at high speeds, can be increased in order to be able to ensure an optimal wiping action. The spoiler is preferably monolithically connected to the wiper arm or the wiper blade. For example, the spoiler may be configured during production of the wiper arm or wiper blade using an injection-molding process. Two or more spoilers may also be formed on the wiper unit.

According to a further advantageous embodiment, the wiper unit has at least one wiper water channel running through the wiper arm and the wiper blade and connectable to a wiper water supply of the windshield wiper system and at least one wiper water outlet opening connected in a communicating manner to the wiper water channel and arranged on the wiper arm or on the wiper blade. In this way, wiper water can be applied to the automobile windshield by means of the wiper unit. The wiper water outlet opening may be configured as a liquid spray diffuser, so that a larger area of the automobile windshield can be exposed to the wiper water. Two or more wiper water outlet openings connected to the wiper water channel in a communicating manner can also be arranged on the wiper arm or the wiper blade, so that the wiper water can be optimally distributed over the automobile windshield. The term wiper water is understood to mean pure water or water with at least one additive, a cleaning agent for example, within the context of the invention. The wiper water channel and the wiper water outlet opening may, for example, be formed using a water-based or gas-based injection-molding method for producing the wiper unit.

According to a further advantageous embodiment, the wiper unit has at least one spacer movably arranged on the wiper arm or the wiper blade which, in the inoperative position, does not project beyond the side of the wiper arm or the wiper blade facing the windshield and, in a functional position brought about by a displacement of the spacer, projects beyond the side of the wiper arm or the wiper blade facing the windshield. If the spacer is located in its functional position, it comes into contact with the automobile windshield and thereby holds the wiper blade spaced apart from the automobile windshield. In this way, the wiper blade can be reliably prevented from freezing on the automobile windshield. The spacer may be pivotably arranged on the wiper arm or wiper blade about a pivot axis running perpendicularly to the wiper unit. The spacer may be switched by manual actuation from its inoperative position into its functional position, and vice versa.

The above problem is furthermore solved by a method according to which at least one fiber-reinforced nonmetallic strip is arranged on the outside of the wiper arm and/or the wiper blade in such a manner that it extends over at least half the length of the wiper arm or the wiper blade, is connected to the wiper arm or the wiper blade in a substance-bonded manner, and is arranged at least partially on a side of the wiper arm or the wiper blade which is arranged facing or facing away from an automobile windshield to be wiped.

The advantages indicated above with reference to the wiper unit are correspondingly associated with the method. In particular, the wiper unit according to one of the aforementioned embodiments or a combination of at least two of these embodiments with one another may be produced by means of the method. Embodiments of the wiper unit which are referred to above may correspond to embodiments of the method, even if specific reference is not made to these individually below.

According to an advantageous embodiment, the wiper arm and the wiper blade are produced connected to one another monolithically. The aforementioned advantages indicated above with reference to the corresponding embodiment of the wiper unit are correspondingly associated with this embodiment.

A further advantageous embodiment envisages that the wiper arm and the wiper blade are produced using a common injection-molding method. The advantages referred to above in relation to the corresponding embodiment of the wiper unit are correspondingly associated with this embodiment. In particular, the wiper unit can be produced using a multi-component injection-molding method.

According to a further advantageous embodiment, the wiper blade is produced by at least partial coating of at least one elastic element using an elastomer injection-molding material. In the advantages referred to above in relation to the corresponding embodiment of the wiper unit are also associated accordingly with this embodiment.

BRIEF DESCRIPTION OF THE DRAWING FIGURES

Figure 2:
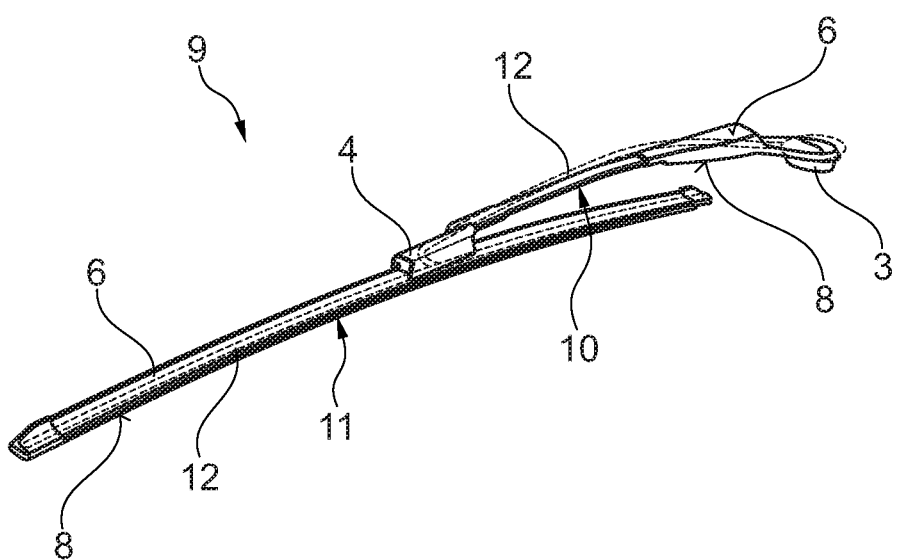
Figure 3:
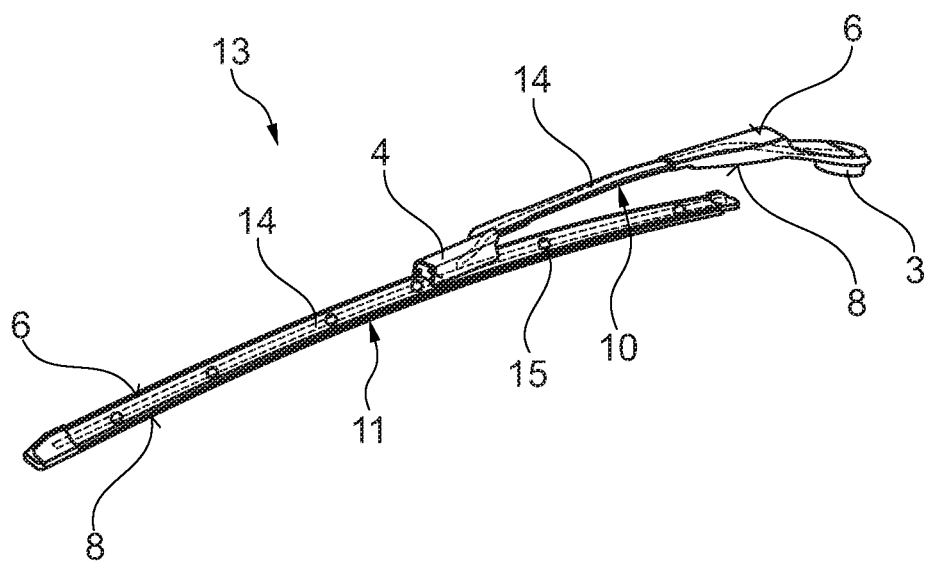
Figure 4:
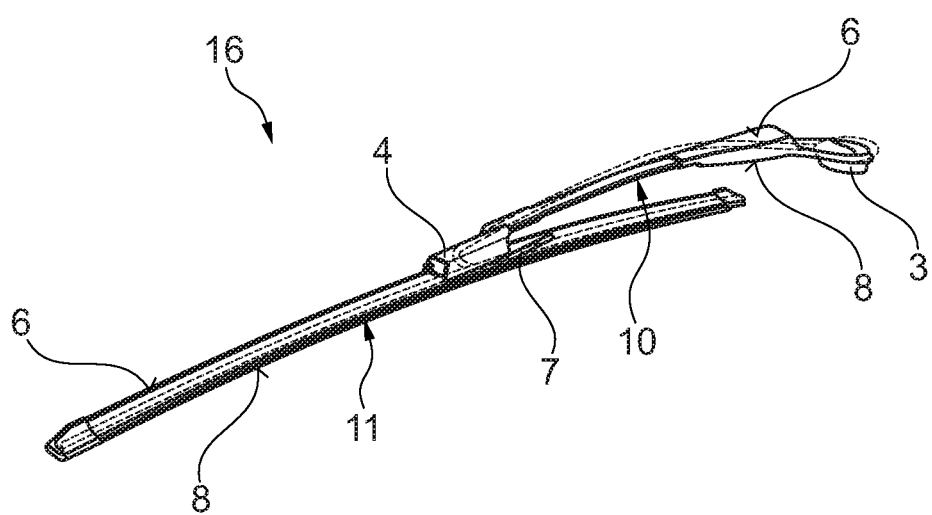
Figure 5:
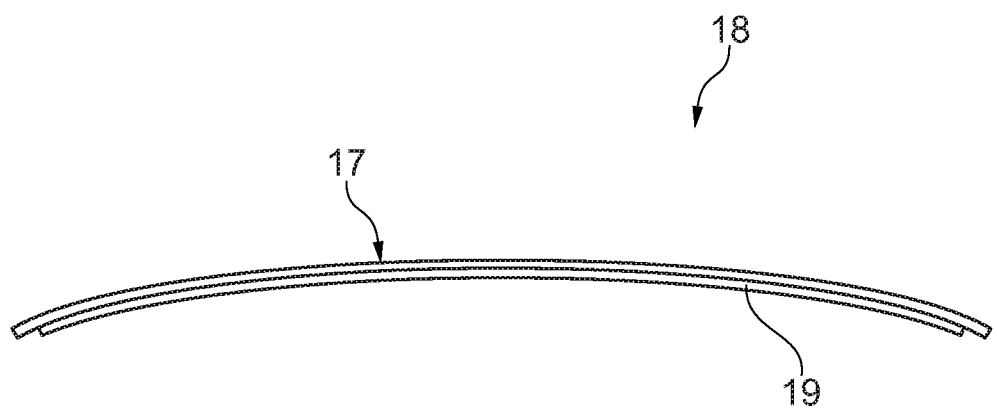

Further advantageous embodiments of the wiper unit and method are disclosed in the dependent claims and the following figure description. In the drawing:

FIG. 1 shows a schematic and perspective representation of an exemplary embodiment of a wiper unit, FIG. 2 shows a schematic and perspective representation of a further exemplary embodiment of a wiper unit, FIG. 3 shows a schematic and perspective representation of a further exemplary embodiment of a wiper unit, FIG. 4 shows a schematic and perspective representation of a further exemplary embodiment of a wiper unit, and FIG. 5 shows a schematic representation of a wiper blade of a further exemplary embodiment of a wiper unit.

In the different figures the same parts are always referred to using the same reference numbers, which is why these are usually also only described once.

DETAILED DESCRIPTION

FIG. 1 shows a schematic and perspective representation of an exemplary embodiment of a wiper unit 1 for a windshield wiper system which is not shown of an automobile which is not shown.

The wiper unit 1 has a wiper arm 2 that can be connected to a wiper drive that is not shown of the windshield wiper system and a wiper blade which is not shown and is carried by the wiper arm 2, which wiper blade can be connected to the wiper arm 2. The wiper arm 2 has a first end portion 3 via which the wiper arm 2 is connectable to the wiper drive, and a second end portion 4 via which the wiper arm 2 is connectable to the wiper blade. At least one spoiler which is not shown may be formed on the wiper arm 2.

A fiber-reinforced nonmetallic strip 5 is arranged on the outside of the wiper arm 2, which nonmetallic strip extends over the majority of the length of the wiper arm 2, is connected to the wiper arm 2 in a substance-bonded manner, and is completely arranged on a side 6 of the wiper arm 2 that is arranged facing away from an automobile windshield which is not shown and is to be wiped.

The wiper unit 1 has a spacer 7 arranged pivotably on the wiper arm 2 which does not project beyond the side 8 of the wiper arm 2 facing the windshield in the inoperative position shown. In a functional position which is not shown and is reached through a displacement of the spacer 7, the space projects beyond the side 8 of the wiper arm 2 facing the windshield. The functional position of the spacer 7 may, for example, be reached by pivoting the spacer 7 about 90° in a counterclockwise direction.

FIG. 2 shows a schematic and perspective representation of a further exemplary embodiment of a wiper unit 9 for a windshield wiper system which is not shown of an automobile which is not shown.

The wiper unit 9 has a wiper arm 10 connectable to a wiper drive which is not shown of the windshield wiper system and a wiper blade 11 supported by the wiper arm 10. The wiper arm 10 has a first end portion 3 via which the wiper arm 10 is connectable to the wiper drive, and a second end portion 4 via which the wiper arm 10 is connected to the wiper blade 11. At least one spoiler which is not shown can be formed on the wiper arm 10 and/or the wiper blade 11.

The wiper arm 10 and the wiper blade 11 are monolithically connected to one another. In particular, the wiper arm 10 and the wiper blade 11 are formed by a single injection-molded component which is formed at least in part from an elastomer. The wiper blade 11 may have at least one elastic element which is not shown and which is provided at least in part with an elastomer casing which is not shown.

On the outside of the wiper arm 10 and the wiper blade 11 is arranged a fiber-reinforced nonmetallic strip 12 which extends substantially over the entire length of the wiper arm 10 and the wiper blade 11, is connected in a substance-bonded manner to the wiper arm 10 and the wiper blade 11, and is completely arranged on one side 6 of the wiper arm 10 and the wiper blade 11 which is arranged facing away from an automobile windshield to be wiped which is not shown.

The wiper unit 9 may exhibit at least one wiper water channel which is not shown and runs through the wiper arm 10 and the wiper blade 11 and is connectable to a wiper water supply of the windshield system which is not shown and at least one wiper water outlet opening which is connected in a communicating manner to the wiper water channel and is arranged on the wiper arm 10 or on the wiper blade 11.

Furthermore, the wiper unit 9 may have at least one spacer which is not shown and is movably arranged on the wiper arm 10 or the wiper blade 11, which spacer does not project beyond the side 8 of the wiper arm 10 or of the wiper blade 11 facing the windshield in the inoperative position. In a functional position brought about by a displacement of the spacer, the spacer projects beyond the side 8 of the wiper arm 10 or of the wiper blade 11 facing the windshield. The spacer may, for example, be configured and arranged in accordance with FIG. 1 or 4.

FIG. 3 shows a schematic and perspective representation of a further exemplary embodiment of a wiper unit 13 for a windshield wiper system which is not shown of a motor vehicle which is not shown.

The wiper unit 13 is particularly distinguished from the exemplary embodiment shown in FIG. 2 in that it has a wiper water channel 14 running through the wiper arm 10 and the wiper blade 11 connectable to a wiper water supply of the windshield wiper system that is not shown and a plurality of wiper water outlet openings 15 connected in a communicating manner to the wiper water channel 14 arranged on the wiper blade 11. The fiber-reinforced nonmetallic strip is not shown in FIG. 3 in the interests of clarity. In order to avoid repetition, reference is moreover made to the above description of FIG. 2.

FIG. 4 shows a schematic and perspective representation of a further exemplary embodiment of a wiper unit 16 for a windshield wiper system which is not shown of an automobile which is not shown.

The wiper unit 16 differs in particular from the exemplary embodiment shown in FIG. 2 in that it has a spacer 7 arranged pivotably on the wiper blade 11 which does not project beyond the side 8 of the wiper blade 11 facing the windshield in the inoperative position shown and in a functional position reached through a displacement of the spacer 7 projects beyond the side 8 of the wiper blade 11 facing the windshield. In order to avoid repetition, reference is furthermore made to the above description of FIG. 2.

FIG. 5 shows a schematic representation of a wiper blade 17 of a further exemplary embodiment of a wiper unit 18 for a windshield wiper system which is not shown of an automobile which is not shown.

A wiper lip 19 is arranged on the wiper blade 17. The wiper blade 17 has a curved or bent design in the unloaded state shown, so that it can be better adapted to the contour of the automobile windshield. The wiper blade 17 can be used for each of the exemplary embodiments shown in FIGS. 1 to 4. The wiper unit 18 may, moreover, be configured according to one of the exemplary embodiments shown in FIGS. 1 to 4.

What is claimed:

1. A wiper unit for an automobile windshield wiper system comprising at least one wiper arm connectable to a wiper drive of the windshield wiper system and at least one wiper blade supported by the wiper arm, wherein (a) at least one fiber-reinforced nonmetallic strip is arranged on an outside of at least one of the wiper arm and the wiper blade, said nonmetallic strip extending over at least half a length of the at least one of the wiper arm and wiper blade, said at least one fiber-reinforced nonmetallic strip being connected to the at least one of the wiper arm and the wiper blade in a substance-bonded manner and (b) the wiper arm and the wiper blade are monolithically connected to one another.

2. The wiper unit as claimed in claim 1, wherein the wiper arm and the wiper blade are formed by a single injection-molded component that is formed at least in part from an elastomer.

3. The wiper unit as claimed in claim 2, wherein the wiper blade has at least one elastic element that is provided at least partially with a casing made of the elastomer.

4. The wiper unit as claimed in claim 3, wherein at least one spoiler is formed on the at least one wiper arm or the at least one wiper blade.

5. The wiper unit as claimed in claim 3, wherein at least one wiper water channel runs through the wiper arm and the wiper blade, said at least one wiper water channel being connected to a wiper water supply of the windshield wiper system and at least one wiper water outlet opening connected to the wiper water channel and arranged on at least one of the wiper arm and the wiper blade.

6. The wiper unit as claimed claim 5, wherein there is at least one spacer movably arranged on the wiper arm or the wiper blade which, in an inoperative position, does not project beyond a side of the wiper arm or the wiper blade facing the windshield and, in a functional position resulting from a displacement of the spacer, projects beyond the side of the wiper arm or the wiper blade facing the automobile windshield.

7. The wiper unit as claimed in claim 1, wherein the wiper blade has at least one elastic element that is provided at least partially with a casing made of an elastomer.

8. The wiper unit as claimed in claim 1, wherein at least one spoiler is formed on the at least one wiper arm and/or the at least one wiper blade.

9. The wiper unit as claimed in claim 1, wherein at least one wiper water channel runs through the wiper arm and the wiper blade, said at least one wiper water channel being connected to a wiper water supply of the automobile windshield wiper system and at least one wiper water outlet opening connected to the at least one wiper water channel and arranged on at least one of the wiper arm and the wiper blade.

10. The wiper unit as claimed claim 1, wherein there is at least one spacer movably arranged on the wiper arm or the wiper blade which, in an inoperative position, does not project beyond a side of the wiper arm or the wiper blade facing the windshield and, in a functional position resulting from a displacement of the spacer, projects beyond the side of the wiper arm or the wiper blade facing the automobile windshield.

11. A method for producing a wiper unit, comprising:
   arranging on an outside of at least one of a wiper arm and a wiper blade at least one fiber-reinforced nonmetallic strip that (a) extends over at least half a length of at least one of said wiper arm and said wiper blade in a substance-bonded manner and (b) faces toward an automobile window to be wiped or away from the automobile window to be wiped;
   and producing said wiper arm and said wiper blade as a monolithic structure.

12. The method of claim 11, including injection molding said wiper arm and said wiper blade.

13. The method of claim 12, including forming said wiper blade by at least partially coating at least one elastic element on said wiper arm using elastomer injection molding material.

\* \* \* \* \*